United States Patent
Kim et al.

(10) Patent No.: US 9,803,059 B2
(45) Date of Patent: Oct. 31, 2017

(54) POLYOLEFIN RESIN MOLDED PRODUCT, METHOD FOR PREPARING THE SAME, AND AIR DUCT USING THE SAME

(71) Applicants: HYUNDAI MOTOR COMPANY, Seoul (KR); KIA MOTORS CORPORATION, Seoul (KR); LOTTE CHEMICAL CORPORATION, Seoul (KR)

(72) Inventors: Hak Soo Kim, Yongin-si (KR); Dae Sik Kim, Yongin-si (KR); KieYoun Jeong, Hwaseong-si (KR); Young-Gyu You, Daejeon (KR); Byung-kook Nam, Daejeon (KR); Seong Min Cho, Daejeon (KR)

(73) Assignees: HYUNDAI MOTOR COMPANY, Seoul (KR); KIA MOTORS CORPORATION, Seoul (KR); LOTTE CHEMICAL CORPORATION, Seoul (KR)

( * ) Notice: Subject to any disclaimer, the term of this patent is extended or adjusted under 35 U.S.C. 154(b) by 361 days.

(21) Appl. No.: 14/555,982

(22) Filed: Nov. 28, 2014

(65) Prior Publication Data

US 2015/0361237 A1 Dec. 17, 2015

(30) Foreign Application Priority Data

Jun. 13, 2014 (KR) ........................ 10-2014-0072422

(51) Int. Cl.
| | | |
|---|---|---|
| *C08J 9/00* | (2006.01) | |
| *C08L 23/12* | (2006.01) | |
| *C08L 23/06* | (2006.01) | |
| *C08J 9/06* | (2006.01) | |
| *B60H 1/00* | (2006.01) | |

(52) U.S. Cl.
CPC .......... *C08J 9/0061* (2013.01); *B60H 1/00564* (2013.01); *C08J 9/0066* (2013.01); *C08J 9/06* (2013.01); *C08J 2201/03* (2013.01); *C08J 2323/12* (2013.01); *C08J 2423/06* (2013.01); *C08J 2423/12* (2013.01)

(58) Field of Classification Search
CPC .... C08J 9/0061; C08J 9/0066; C08J 2323/12; C08J 2323/06; C08J 2423/12; C08J 2205/044; C08L 23/004; C08L 23/10; C08L 23/26
See application file for complete search history.

(56) References Cited

U.S. PATENT DOCUMENTS

| | | | |
|---|---|---|---|
| 5,149,579 A * | 9/1992 | Park | C08J 9/12 428/213 |
| 6,251,319 B1 * | 6/2001 | Tusim | B29C 44/22 264/146 |
| 2011/0224322 A1 | 9/2011 | Riise et al. | |

FOREIGN PATENT DOCUMENTS

| | | |
|---|---|---|
| JP | 2006-045356 A | 2/2006 |
| JP | 5025549 B2 | 9/2012 |
| KR | 10-2005-0086003 A | 8/2005 |
| KR | 10-0654979 B1 | 11/2006 |
| KR | 10-1012743 B1 | 2/2011 |
| KR | 10-2011-0137568 A | 12/2011 |
| KR | 10-2012-0095011 A | 8/2012 |
| KR | 10-2013-0074805 * | 7/2013 |
| KR | 10-2013-0074805 A | 7/2013 |

* cited by examiner

*Primary Examiner* — Kara Boyle

(74) *Attorney, Agent, or Firm* — McDermott Will & Emery LLP

(57) ABSTRACT

A polyolefin resin molded product includes a base which comprises at least one kind of polypropylene resin having a crystallization temperature of 112° C. to 150° C.; low density polyethylene; an inorganic filler; and an olefin polymer comprising 2 wt % to 10 wt % of a reactive functional group bonded to a main chain or an end thereof and having a diameter of 0.5 μm to 200 μm. The base has foam cells having an average diameter of 20 μm to 50 μm are distributed on thereon.

14 Claims, 1 Drawing Sheet

POLYOLEFIN RESIN MOLDED PRODUCT, METHOD FOR PREPARING THE SAME, AND AIR DUCT USING THE SAME

CROSS-REFERENCE TO RELATED APPLICATION

This application claims the benefit of priority to Korean Patent Application No. 10-2014-0072422 filed in the Korean Intellectual Property Office on Jun. 13, 2014, the entire contents of which are incorporated herein by reference.

TECHNICAL FIELD

The present disclosure relates to a polyolefin resin molded product, a method for preparing the same, and an air duct using the same. More specifically, the present disclosure relates to a polyolefin resin molded product for improving interfacial adhesion and dispersibility, and a method for preparing the same, and an air duct using the same.

BACKGROUND

An air conditioning system for automobiles commonly includes a cooling device. A refrigerant during a cooling process is compressed by a compressor driven by engine power and flows in a condenser. The refrigerant is then heat exchanged by air blast of a cooling fan of a blower unit, sequentially passes through a receiver driver, an expansion valve, and an evaporator, and flows in a compressor again. The air ventilated by the cooling fan is heat exchanged with the refrigerant passing through the evaporator, and flows in the interior in a state of cool air, thereby cooling inside the automobiles. A heating device includes a coolant of engine passing through a heater core and returning to the engine during a heating process. Air ventilated by an air blast fan is heat exchanged with the coolant passing through the heater core, and flows in the interior in the state of warm air, thereby heating inside the automobiles.

That is, the main function of the air conditioning system for automobiles is to provide a pleasant environment for passengers under various weather or running conditions.

In the air conditioning system for automobiles, ventilated air moves along an air duct that is a transfer passage of air, and is ventilated into inside the automobiles through an air vent connected to one end of the air duct. The air duct for the air conditioning system for automobiles is commonly manufactured by blow molding a polyethylene resin.

However, a solid type of air duct manufactured by molding the polyethylene resin has high density, thus increasing weight of the automobiles.

Further, the solid type of air duct generates condensation of moisture due to an inferior insulation property and lowers cooling/heating efficiency of the automobiles, and a discharged amount of carbon dioxide is increased, thus reducing automobile mileage.

Thus, a non-woven fabric is attached to an external part of the solid type of air duct to improve the insulation property and to reduce noise, but there are problems due to the weight increase and a more complexed manufacturing process.

To solve these problems, ongoing studies have been undertaken for applying a foam that is expanded by a blowing agent and has a light weight and an excellent insulation property as an air duct.

However, the expandable foam air duct may not have desired hardness due to limitations in a resin which constitutes the foam, and thus it is difficult to manufacture an air duct having satisfactory mechanical properties and surface quality.

Accordingly, there is a demand for the development of a resin molded product for an air duct having an excellent surface quality while securing good insulation and mechanical properties.

SUMMARY

An aspect of the present inventive concept provides a polyolefin resin molded product having excellent heat insulation and mechanical properties and surface quality by improving interfacial adhesion and dispersibility.

Another aspect of the present inventive concept provides a method for preparing the polyolefin resin molded product.

Another aspect of the present inventive concept provides an air duct using the polyolefin resin molded product. According to an exemplary embodiment of the present inventive concept, a polyolefin resin molded product comprises a base. The base comprises at least one kind of polypropylene resin having a crystallization temperature of 112° C. to 150° C., a low density polyethylene, an inorganic filler, and an olefin polymer comprising 2 wt % to 10 wt % of a reactive functional group bonded to a main chain or an end thereof and having a diameter of 0.5 μm to 200 μm. The base includes foam cells having an average diameter of 20 μm to 50 μm distributed thereon.

According to another exemplary embodiment of the present inventive concept, a method for preparing a polyolefin resin molded product includes mixing at least one kind of polypropylene resin having a crystallization temperature of 112° C. to 150° C., low density polyethylene, an inorganic filler, an olefin polymer, and a blowing agent, and molding the mixture. The olefin polymer comprises 2 wt % to 10 wt % of a reactive functional group bonded to a main chain or an end thereof and has a diameter of 0.5 μm to 200 μm.

According to another exemplary embodiment of the present inventive concept, an air duct includes a base which comprises at least one kind of polypropylene resin having a crystallization temperature of 112° C. to 150° C., low density polyethylene, and an inorganic filler and an olefin polymer comprising 2 wt % to 10 wt % of a reactive functional group bonded to a main chain or an end thereof and having a diameter of 0.5 μm to 200 μm. The base includes foam cells having an average diameter of 20 μm to 50 μm distributed thereon.

DETAILED DESCRIPTION

Figure 1:
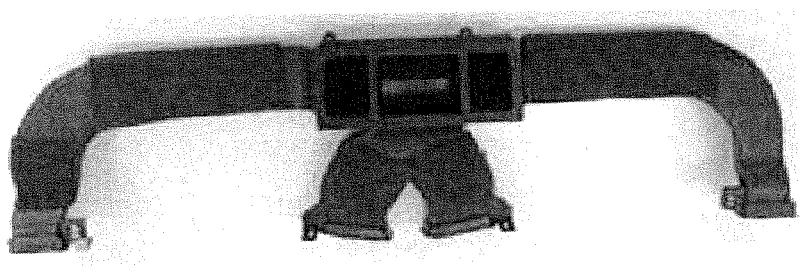
FIG. 1 shows an example of an air duct according to an exemplary embodiment of the present inventive concept.

Hereinafter, a polyolefin resin molded product, a method for preparing the same, and an air duct using the same according to exemplary embodiments of the present inventive concept will be explained in detail.

According to an embodiment of the present inventive concept, a polyolefin resin molded product includes a base which comprises at least one kind of polypropylene resin having a crystallization temperature of 112° C. to 150° C.; low density polyethylene; an inorganic filler; and an olefin polymer comprising 2 wt % to 10 wt % of a reactive functional group bonded to a main chain or an end thereof and having a diameter of 0.5 μm to 200 μm. The base includes foam cells having an average diameter of 20 μm to 50 μm distributed thereon.

Interfacial adhesion between the polypropylene resin and the inorganic filler, and the dispersibility of the inorganic filer may be improved, and thus, a material having excellent mechanical properties and surface quality can be prepared by using the polyolefin resin molded product.

As used herein, the 'kind' in 'one kind' refers to a classification by a crystallization temperature range of polypropylene.

The polypropylene resin having the crystallization temperature of 112° C. to 150° C., which is included in the base, may include a propylene homopolymer, a copolymer of propylene and ethylene, a copolymer of propylene and C4-10 olefin monomer, a block copolymer of polypropylene and ethylene-propylene rubber, and a mixture thereof. Thus, stiffness and impact resistance of the base may be improved.

Further, the copolymer of propylene and ethylene comprises a polyethylene repeat unit of less than 12 mol % or 0.1 mol % to 10 mol %.

Examples of the C4-10 olefin monomer may be used without specific limitations and include butylene, octene, and the like.

In case the polypropylene resin includes the copolymer of propylene and ethylene, particularly, a copolymer of propylene and 12 mol % or less of ethylene, a phase separation may occur, and thus, the foaming property may be improved.

The polypropylene resin having the crystallization temperature of 112° C. to 150° C. may have a melt index of 0.5 g/10 min to 10 g/10 min under a condition of a temperature of 230° C. and a pressure of 2.16 Kgf.

The melt index means the weight of resin flowing through a capillary tube for 10 minutes under constant load and temperature.

If a melt index of the polypropylene resin having the crystallization temperature of 112° C. to 150° C. is less than 0.5 g/10 min, moldability may decrease, and if a melt index of the polypropylene resin having the crystallization temperature of 112° C. to 150° C. is greater than 10 g/10 min, thickness uniformity of the polyolefin resin molded product may decrease.

The polypropylene resin having the crystallization temperature of 112° C. to 150° C., which is included in the base, may include at least one kind of polypropylene having a crystallization temperature of 125° C. to 150° C., or 126° C. to 135° C.

A crystallization temperature (Tc) means a heat treatment temperature required for crystallization, and it may be measured using differential scanning calorimetry (DSC).

If the at least one kind of propylene resin having the crystallization temperature of 125° C. to 150° C. is included, a surface solidification speed may increase, and thus, tearing of the foam cells on a surface of the base may be minimized when preparing the polyolefin resin molded product.

The polypropylene resin having the crystallization temperature of 112° C. to 150° C., which is included in the base, may further include at least one kind of propylene resin having a crystallization temperature of 112° C. or more and less than 125° C.

Specifically, the polypropylene resin having the crystallization temperature of 112° C. to 150° C., which is included in the base, may include the at least one kind of polypropylene resin having the crystallization temperature of 125° C. to 150° C. and the at least one kind of polypropylene resin having the crystallization temperature of 112° C. or more and less than 125° C.

A weight ratio of the polypropylene having the crystallization temperature of 112° C. or more and less than 125° C. to the polypropylene resin having the crystallization temperature of 125° C. to 150° C. is 1.5:1 to 10:1 or 1.8:1 to 8:1.

More specifically, the polypropylene having the crystallization temperature of 125° C. to 150° C. may be included in the content of 5 wt % to 40 wt % or 8 wt % to 35 wt %, based on a total mount of the polypropylene resin having the crystallization temperature of 112° C. to 150° C., which is included in the base.

If the content of the polypropylene having a crystallization temperature of 125° C. to 150° C. has less than 5 wt %, the surface solidification speed of the polyolefin resin molded product may become slow, and thus, tearing of the foam cells may be generated on the surface, and if the content of the polypropylene having the crystallization temperature of 125° C. to 150° C. has greater than 40 wt %, moldability of the polyolefin resin molded product may be lowered.

The polypropylene resin having the crystallization temperature of 112° C. to 150° C. may be included in the content of 65 wt % to 93 wt % or 70 wt % to 90 wt %.

If the content of the polypropylene resin is less than 65 wt %, a use amount of the inorganic filler may relatively increase, and thus, a gas may be generated affecting the product appearance when molding, and if the content of the polypropylene resin is greater than 93 wt %, stiffness and heat resistance increasing effects according to the addition of the inorganic filler may be insignificant.

The olefin polymer that is included in the base may include 2 wt % to 10 wt % of a reactive functional group bonded to the main chain or the end thereof.

The olefin polymer is used to increase compatibility of the polypropylene resin with the inorganic filler, and it may include a polypropylene as the main chain (basic chain), and a functional group that is reactive with the inorganic filler may be bonded to the main chain or the end thereof.

The reactive functional group may include a carboxyl group, a hydroxyl group, and a mixture thereof. Examples of the carboxyl group may be used without specific limitations and include maleic acid, maleic anhydride, and the like.

As a blowing agent, those known to be usable for foam molding of a polymer resin or polyolefin resin may be used without specific limitations.

Examples of the blowing agent may include: azodicarbonamide; N,N'-dinitrosopentamethylenetetramine; P,P'-oxybis(benzenesulfonyl hydrazide); P,P'-toluenesulfonylhydrazide; carbon dioxide; nitrogen; sodium bicarbonate; and the like.

Further, the reactive functional groups may be included in the content of 2 wt % to 10 wt %, or 3 wt % to 8 wt %, based on the total weight of the olefin polymer.

If the content of the reactive functional groups is less than 2 wt %, a reaction between the inorganic filler and the olefin polymer may decrease, and thus, the interfacial adhesion between the inorganic filler and the polypropylene resin may decrease.

On the other hand, if the content of the reactive functional groups is greater than 10 wt %, an impact strength of the polyolefin resin molded product may decrease.

The polyolefin polymer may be included in the polyolefin resin molded product in the content of 0.1 wt % to 7 wt %, or 0.5 wt % to 5 wt %.

If the olefin polymer is not added, there may be limits on improvement in mechanical properties, dimensional stability, and surface quality due to the decrease of dispersion efficiency and the interfacial adhesion between the polyolefin resin and the inorganic filler, and if the content of the olefin polymer is greater than 7 wt %, the impact strength of the polyolefin resin molded product may decrease.

The olefin polymer may have a diameter of 0.5 µm to 200 µm, or 1 µm to 150 µm.

If a diameter of the olefin polymer is less than 0.5 µm, productivity may decrease due to the small diameter of the olefin polymer, and if it is greater than 200 µm, interfacial adhesion between the polypropylene resin and the inorganic filler and dispersion efficiency may significantly decrease.

The low density polyethylene included in the base may have a density of 0.890 $g/cm^3$ to 0.940 $g/cm^3$, 0.900 $g/cm^3$ to 0.935 $g/cm^3$, or 0.918 $g/cm^3$ to 0.928 $g/cm^3$.

Polyethylenes having different densities may be prepared according to a preparation method, and the low density polyethylene may be applied in the present disclosure.

If the density of the low density polyethylene is less than 0.890 $g/cm^3$, the eluted amount of low molecular weight compounds may become large, thus lowering the foaming property, and if the density of the low density polyethylene is greater than 0.940 $g/cm^3$, crystallinity may become too high, thus limiting the range of a foaming process.

The low density polyethylene may be included in the polyolefin resin molded product in the content of 5 wt % to 20 wt %, or 8 wt % to 15 wt %.

If the content of the low density polyethylene is less than 5 wt %, moldability may decrease, and if the content of the low density polyethylene is greater than 20 wt %, impact strength may decrease.

The inorganic filler that is included in the base is used to reinforce stiffness and to improve the foaming property, and those commonly used may be used without specific limitations.

For example, the inorganic filler may include talc, calcium carbonate, calcium sulfate, magnesium oxide, calcium stearate, wollastonite, mica, silica, calcium silicate, clay, carbon black, and a mixture thereof.

The inorganic filler may have an average diameter of 0.5 µm to 10 µm, or 1 µm to 9 µm.

If the average diameter of the inorganic filler is less than 0.5 µm, productivity of the polyolefin resin molded product may decrease, and if the average diameter of the inorganic filler is greater than 10 µm, the foaming property of the polyolefin resin molded product may decrease.

The inorganic filler may be included in the polyolefin resin molded product in the content of 0.1 wt % to 10 wt %, or 0.5 wt % to 5 wt %.

If the content of the inorganic filler is less than 0.1 wt %, stiffness may be lowered, and if the content of the inorganic filler is greater than 10 wt %, specific gravity may increase and impact strength may decrease.

Further, foam cells having an average diameter of 20 µm to 50 µm may be distributed on the base. The foam cells refer to bubbles included in the polyolefin resin molded product, and the foam cells may be uniformly distributed in the polyolefin resin molded product.

As a foaming method, various methods known in the art including a physical foaming method, a chemical foaming method, and the like may be used, or a chemical foaming method using a blowing agent may be used.

The foam cells may have an average diameter of 20 µm to 50 µm or 25 µm to 45 µm.

If an average diameter of the foam cells included in the polyolefin resin molded product is less than 20 µm, the volume occupied by the foam cells may be small and it may be difficult to obtain optimum density, thus decreasing insulation effect of the polyolefin resin molded product.

To the contrary, if an average diameter of the foam cells included in the polyolefin resin molded product is greater than 50 µm, porosity of the polyolefin resin molded product may become significantly large, and thus mechanical strength may decrease.

The base included in the polyolefin resin molded product may have a density of 0.3 g/ml to 0.8 g/ml or 0.4 g/ml to 0.7 g/ml.

As explained above, the base may include the foam cells inside thereof, and the gas existing inside of the foam cells has a very large intermolecular distance, and thus, as the foam cells are generated, the density of the base included in the polyolefin resin molded product decreases.

If a density of the base included in the polyolefin resin molded product is less than 0.3 g/ml, too many foam cells may be generated in the polyolefin resin molded product, thus lowering mechanical properties of the polyolefin resin molded product such as weather resistance and the like, and if a density of the base included in the polyolefin resin molded product is greater than 0.8 g/ml, the foam cells may not be sufficiently generated in the polyolefin resin molded product, thus decreasing the insulation effect.

The polyolefin resin molded product may further include additives including an antioxidant, a UV stabilizer, a flame retardant, a coloring agent, a plasticizer, a heat stabilizer, a slip agent, an antistatic agent, a blowing agent, and a mixture thereof.

The additives may be added to improve the performance and processibility of the polyolefin resin molded product, and examples of the antioxidant, UV stabilizer, flame retardant, coloring agent, plasticizer, heat stabilizer, slip agent, antistatic agent, and blowing agent may include those commonly used in polyolefin resin compositions.

Further, various additives previously known may be further included without departing from the spirit of the present disclosure.

The amount of the additives may be controlled to an optimum range, considering the total preparation amount and time and the like, within a range known to be usable in preparing the polyolefin resin molded product.

The additives may be further added while mixing the polypropylene resin, polyethylene, inorganic filler, and olefin polymer, or they may be added in a separate adding step.

The polyolefin resin molded product may have a tensile strength of 230 $kg/cm^2$ or more, or 235 $kg/cm^2$ to 300 $kg/cm^2$ according to American Society for Testing and Materials (ASTM) D638 Standard.

Ae tensile strength means a value obtained by dividing a maximum tensile load until a test piece breaks by a cross-sectional area of the test piece before breaking.

If a tensile strength of the polyolefin resin molded product according to ASTM D638 Standard is less than 230 $kg/cm^2$, it means that the polyolefin resin molded product does not have a sufficient level of mechanical strength.

The polyolefin resin molded product may have a flexural modulus of 9700 $kg/cm^2$ or more, or 9800 $kg/cm^2$ to 14,000 $kg/cm^2$ according to ASTM D790 Standard.

A flexural modulus means a ratio of stress to strain within an elastic limit when a flexural load is applied to a polymer.

In general, as a crystallinity, melt index, and isotacticity are higher, the flexural modulus is higher (better). In general, a flexural modulus of a homopolymer is higher than that of a copolymer.

If a flexural modulus of the polyolefin resin molded product according to ASTM D790 Standard is less than 9700 kg/cm$^2$, it means that the polyolefin resin molded product does not have a sufficient level of mechanical strength.

The polyolefin resin molded product may have an izod impact strength of 37 kg·cm or more, or 38 kg·cm to 50 kg·cm according to ASTM D256 Standard.

An izod impact strength represents a strength to resistance exhibited when an object receives an impact, and it is represented by a total energy required for breaking a sample or absorbed energy to break per unit length of the sample.

In general, as the molecular weight and glass transition temperature are higher, the impact strength decreases.

If the polyolefin resin molded product has an IZOD impact strength of less than 37 kg·cm according to ASTM D256 Standard, it means that the polyolefin resin molded product does not have a sufficient level of mechanical strength.

The polyolefin resin molded product may have a heat deflection temperature of 80° C. or more, or 85° C. to 120° C. at 0.455 MPa pressure according to ASTM D648 Standard.

A heat deflection temperature means a temperature at which the polyolefin resin molded product is deflected by any amount under a constant load.

If a heat deflection temperature at 0.455 MPa pressure according to ASTM D648 Standard is less 80° C., the polyolefin resin molded product may not secure sufficient heat resistance.

Further, the polyolefin resin molded product may have 10/cm$^2$ or less, 5/cm$^2$ or less, or 5/cm$^2$ to 0/cm$^2$ open foam cells on a surface thereof, or the open foam cells may not substantially exist on the surface of the polyolefin resin molded product.

The open foam cells on the surface of the molded product refers to foam cells that are crystallized while the tearing of the foam cells occurs on the surface when the molded product is prepared, and as the number of open foam cells on the surface of the molded product per unit area increases, surface quality may decrease.

According to another exemplary embodiment of the present inventive concept, a method for preparing a polyolefin resin molded product includes mixing at least one polypropylene resin having a crystallization temperature of 112° C. to 150° C., low density polyethylene, an inorganic filler, an olefin polymer, and a blowing agent, and molding the mixture. The olefin polymer comprises 2 wt % to 10 wt % of a reactive functional group bonded to the main chain or end thereof and has a diameter of 0.5 μm to 200 μm.

The step of mixing comprises melt-extruding the at least one kind of polypropylene resin having a crystallization temperature of 112° C. to 150° C., the low density polyethylene, the inorganic filler, and the olefin polymer; and adding the blowing agent to the melt extruded mixture.

The at least one polypropylene resin may be completely melted and mixed in an extruder.

As explained above, the step of mixing may further include adding additives which include an antioxidant, a UV stabilizer, a flame retardant, a coloring agent, a plasticizer, a heat stabilizer, a slip agent, an antistatic agent, the blowing agent, or a mixture thereof.

The melt extrusion may be progressed at a screw rotational speed of 200 rpm to 1000 rpm, or 300 rpm to 800 rpm, for 5 to 90 seconds, or 10 to 60 seconds.

The screw rotational speed may be 200 rpm or more to effectively induce shear flow and elongational flow required for mixing of the resin and dispersion of the inorganic filler in the extruder after the mixture is introduced in the extruder having two or more screws. Further, the screw rotational speed may be 1000 rpm or less to prevent degradation of the at least one polypropylene resin, the low density polyethylene, and the olefin polymer.

A residence time in the extruder needs to be 5 seconds or more so that the at least one polypropylene resin, the polyethylene, the inorganic filler, and the olefin polymer may be sufficiently mixed, and needs to be 90 seconds or less to prevent degradation and improve productivity.

The melt extrusion temperature may be 160° C. to 200° C.

If the melt extrusion temperature is less than 160° C., it may be difficult to melt the polyolefin resin molded product at a rapid speed, and thus, productivity may decrease, and if the melt extrusion temperature is greater than 200° C., the polyolefin resin molded product may degrade.

The blowing agent refers to materials that are combined with plastic or rubber and the like to form bubbles, and a chemical blowing agent, a physical blowing agent, and the like may be used according to the kind and properties, use, processing method, and conditions of resin or rubber, and the like.

The content ratio of the resin and the blowing agent in a raw material composition may be appropriately selected by a skilled person in the art considering the foaming property of the blowing agent and the like.

As the blowing agent, those known to be usable for foam molding of a polymer resin or polyolefin resin may be used without specific limitations.

Examples of the blowing agent may include: azodicarbonamide; N,N'-dinitrosopentamethylenetetramine; P,P'-oxybis(benzenesulfonyl hydrazide); P,P'-toluenesulfonylhydrazide; carbon dioxide; nitrogen; sodium bicarbonate; and the like. The blowing agent may be added in the amount of 1 phr to 10 phr, or 2 phr to 5 phr.

If an added amount of the blowing agent is less than 1 phr, foam cells distributed on the base may not be sufficiently formed, and thus, it may be difficult to secure an insulation property of the final polyolefin resin molded product.

Further, if an added amount of the blowing agent is greater than 10 phr, foam cells may be excessively formed, and thus, mechanical properties of the polyolefin reins molded product may decrease.

In the step of mixing the at least one kind of polypropylene resin, the low density polyethylene, the inorganic filler, the olefin polymer, and the blowing agent and molding the mixture, commonly known molding methods may be used without specific limitations.

One example of the molding method may include blow molding, and specifically, the blow molding method may include preparing a tube shaped parison and inserting the prepared parison between an upper mold and a lower mold. The upper mold and the lower mold are closed with the parison inserted therebetween to assemble a mold. Hot compressed air is instilled and blow molding is progressed, so that the parison is inflated in the form of a cavity, and simultaneously, a plurality of ribs are formed on one side of the parison by inserting a blade mold, while a blow nozzle is inserted in one end of the parison located in the cavity of the mold. The blade mold is opened to remove the blade insert from the rib, while the parison is completely inflated in the form of a mold cavity. The blow molded product is cooled in the mold to room temperature while the blade mold is opened. The upper mold and the lower mold are opened to release them from each other. The solidified blow molded product is taken out from the mold. Unnecessary parts attached to the blow molded product are removed to complete molding of the product.

According to another exemplary embodiment of the present inventive concept, an air duct including a base which comprises at least one kind of polypropylene resin having a crystallization temperature of 112° C. to 150° C.; low density polyethylene; an inorganic filler, and an olefin polymer comprising 2 wt % to 10 wt % of a reactive functional group bonded to a main chain or an end thereof and having a diameter of 0.5 μm to 200 μm. Foam cells having an average diameter of 20 μm to 50 μm are distributed on the base. The air duct is used as interior/exterior materials of automobiles, and specifically, it may be used for an air conditioning system of the automobiles and the like.

The air duct may include: a suction part located in the center; a left side duct part and a right side duct part, respectively located in the left and right sides of the suction part; and a central duct part provided adjacent to a top of the suction part.

The suction part may be disposed between side suction ports of the left side duct part and the right side duct part and include a central suction port formed as a through hole between the side suction ports. The central suction port may have a partition bar that is disposed in a center of a rectangular frame.

Hereinafter, the air duct will be explained in detail with reference to FIG. 2.

Figure 2:
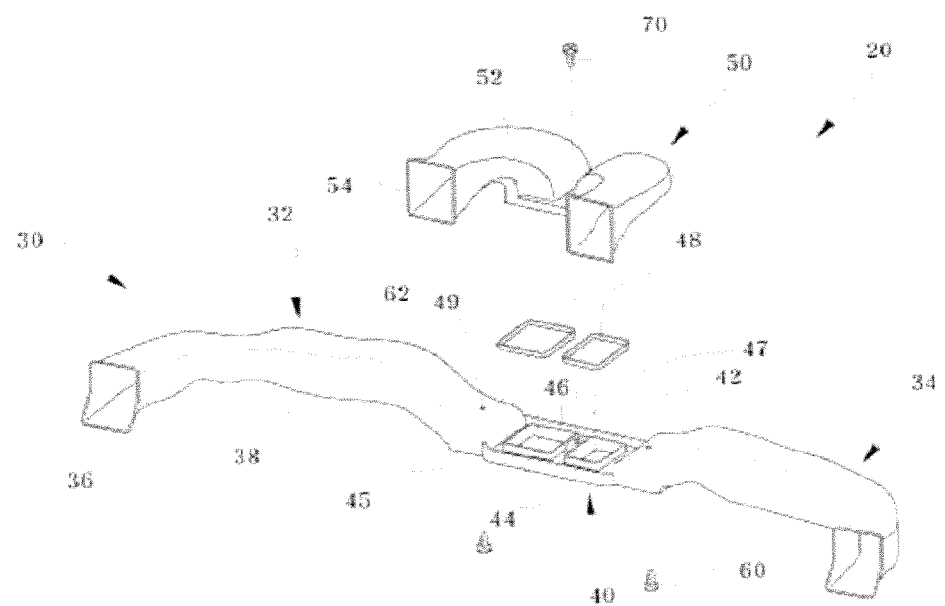
FIG. 2 shows an exploded perspective view of an air duct according to an exemplary embodiment of the present inventive concept.

FIG. 2 is an exemplary view of an air duct. The air duct according to the present disclosure includes a left side duct part 32 and a right side duct part 34 around a suction part 40.

At one end of the left side duct part 32 and the right side duct part 34, a discharge port 36 connected with an air vent (not shown) may be formed.

The suction part 40 includes side suction ports 45 respectively formed at a bottom of both sides for suctioning air from the left side duct part 32 and the right side duct part 34, and a central suction port 44 formed between the side suction ports 45.

The suction part 40 formed of the central suction port 44 and the side suction ports 45 is disposed between the left side duct part 32 and the right side duct part 34.

A central duct part 50 may be combined with the suction part 40 by a fixing bolt 70.

A partition bar 46 is installed inside a rectangular frame 42, so that two central suction ports 44 are formed around the partition bar 46. According to the present disclosure, a polyolefin resin molded product having improved interfacial adhesion, dispersibility, insulation property, mechanical properties, and surface quality, a method for preparing the same, and an air duct using the same are provided.

Hereinafter, the present disclosure will be explained in detail with reference to the following examples. However, these examples are only to illustrate the inventive concept, and the scope of the inventive concept is not limited thereto.

Examples 1 to 5: Preparation of Polyolefin Resin Molded Products and Air Ducts (1) Preparation of a Polyolefin Resin Base Reactants were mixed as shown in the following Table 1, the mixture was introduced into a twin screw extruder having L/D (a ratio of a length to a diameter of a screw) of 40 and a screw diameter of 30 mm, blended at a screw rotational speed of 400 rpm for 35 seconds while melting at a temperature of 180° C., and then discharged through a die to prepare a polyolefin resin base.

(2) Preparation of a Polyolefin Resin Molded Product

The poly olefin resin base was introduced into a blow molding machine together with 3 phr of a chemical blowing agent and blow molded to prepare a polyolefin resin molded product.

(3) Preparation of an Air Duct

An air duct was manufactured using the polyolefin resin molded product.

Comparative Examples 1 to 3: Preparation of Polyolefin Resin Molded Products and Air Ducts Polyolefin resin molded products and air ducts were prepared by using the same method as in the examples above, except compositions of the reactants, as shown in the following Table 2.

Experimental Example: Measurement of Physical Properties of Polyolefin Resin Molded Products Obtained in Examples and Comparative Examples Physical properties of the polyolefin resin molded products obtained in examples and comparative examples were measured by the following method, and the results are respectively shown in the following Table 1 and Table 2.

1. Mechanical Properties 1-1. Tensile Strength (kg/cm$^2$)

Manufacturing specimens having a thickness of ⅛ inches using the polyolefin resin molded products were obtained in the examples and comparative examples were used to measure a tensile strength according to ASTM D638 Standard.

1-2. Flexural Modulus (kg/cm$^2$)

The manufacturing specimens having a thickness of ⅛ inches using the polyolefin resin molded products obtained in the examples and comparative examples were used to measure a flexural modulus according to ASTM D790 Standard.

1-3. IZOD Impact Strength (kg·cm)

The manufacturing specimens having a thickness of ⅛ inches using the polyolefin resin molded products obtained in the examples and comparative examples were used to measure an IZOD impact strength according to ASTM D256 Standard.

2. Heat Deflection Temperature (° C.)

Manufacturing specimens having a size of 127 mm×13 mm×10 mm using the polyolefin resin molded products obtained in the examples and comparative examples were used to measure a heat deflection temperature at 0.455 MPa pressure according to ASTM D648.

3. Density (g/ml)

For the polyolefin resin molded products obtained in the examples and comparative examples, a density was measured.

4. Surface Quality 4-1. Average Diameter of Foam Cells (μm)

For the polyolefin resin molded products obtained in the examples and comparative examples, an average diameter of the foam cells was measured within a 1×1 cm range using an optical microscope.

4-2. Open Foam Cells on the Surface (number/cm$^2$)

For the polyolefin resin molded products obtained in the examples and comparative examples, the number of open foam cells on a surface of the blow molded product was measured within a 1×1 cm range using an optical microscope.

The compositions of the polyolefin resin molded products of the examples and comparative examples and the results of the experimental examples are described in the following Table 1 and Table 2.

compared to the polyolefin resin molded products of the comparative examples, and exhibited a heat deflection temperature of 80° C. or more and density of 0.8 g/ml or less.

Further, the average diameter of foam cells existing on the polyolefin resin molded products of the examples was decreased, and the number of surface open foam cells of the

TABLE 1

Compositions of the polyolefin resin molded products of the examples and the results of the experimental examples

| | Example | | 1 | 2 | 3 | 4 | 5 |
|---|---|---|---|---|---|---|---|
| Composition | Polypropylene (Tc at 118° C.) | wt % | 78 | 68 | 58 | 76 | 66 |
| | Polypropylene (Tc at 130° C.) | wt % | 10 | 20 | 30 | 10 | 20 |
| | Low density polyethylene | wt % | 10 | 10 | 10 | 10 | 10 |
| | Polypropylene polymer (comprising 4 wt % of maleic anhydride, average diameter 100 μm) | wt % | 1 | 1 | 1 | 3 | 3 |
| | Talc (average diameter 8 μm) | wt % | 1 | 1 | 1 | 1 | 1 |
| Physical Properties | Tensile strength (yield) | kg/cm² | 240 | 243 | 250 | 270 | 275 |
| | Flexural modulus | kg/cm² | 10,000 | 10,500 | 11,000 | 12,500 | 12,800 |
| | IZOD impact strength(@23° C.) | kg · cm | 44 | 43 | 40 | 40 | 38 |
| | Heat deflection temperature | ° C. | 89 | 95 | 98 | 105 | 108 |
| | Density | g/ml | 0.69 | 0.66 | 0.65 | 0.61 | 0.53 |
| | Average diameter of foam cells | μm | 40 | 37 | 35 | 33 | 30 |
| | Surface open foam cells | number/cm² | 3 | 3 | 2 | 0 | 1 |

TABLE 2

Compositions of the polyolefin resin molded products of the comparative examples and the results of the experimental examples

| | | | Comparative Example | | |
|---|---|---|---|---|---|
| | | | 1 | 2 | 3 |
| Composition | Polypropylene (Tc at 118° C.) | wt % | 78 | 68 | 58 |
| | Polypropylene (Tc at 124° C.) | wt % | 10 | 20 | 30 |
| | Low density polyethylene | wt % | 10 | 10 | 10 |
| | Polypropylene polymer (comprising 1 wt % of maleic anhydride, average diameter 5 mm) | wt % | 1 | 1 | 1 |
| | Talc (average diameter 8 μm) | wt % | 1 | 1 | 1 |
| Physical Properties | Tensile strength (yield) | kg/cm² | 225 | 227 | 227 |
| | Flexural modulus | kg/cm² | 9,100 | 9,200 | 9,500 |
| | IZOD impact strength (@23° C.) | kg · cm | 35 | 33 | 32 |
| | Heat deflection temperature | ° C. | 75 | 77 | 79 |
| | Density | g/ml | 0.85 | 0.83 | 0.81 |
| | Average diameter of foam cells | μm | 200 | 170 | 160 |
| | Surface open foam cells | number/cm² | 13 | 12 | 12 |

As shown in Table 1 and Table 2, the polyolefin resin molded products of the examples include polypropylene having a crystallization temperature (Tc) of 130° C. and a polypropylene polymer having a diameter of 100 μm and including 4 wt % of maleic anhydride, while the polyolefin resin molded products of the comparative examples include polypropylene having a crystallization temperature (Tc) of 124° C. and a polypropylene polymer having a diameter of 5 mm and including 1 wt % of maleic anhydride.

As such, as the polyolefin resin molded products of the examples include polypropylene having a crystallization temperature (Tc) of 125° C. or more and the polypropylene polymer having diameter of 0.5 to 200 μm and including 2 to 10 wt % of maleic anhydride bonded thereto, they exhibited improved mechanical properties including tensile strength, flexural modulus, impact strength, and the like polyolefin resin molded products of the examples was reduced, and thus, surface quality is improved.

What is claimed is:

1. A polyolefin resin molded product comprising a base resin which comprises a melt extruded mixture of at least one kind of polypropylene resin having a crystallization temperature of 125° C. to 150° C.; at least one kind of polypropylene resin having a crystallization temperature of 112° C. or more and less than 125° C.; low density polyethylene; an inorganic filler; and an olefin polymer pellets comprising 2 wt % to 10 wt % of a reactive functional group bonded to a main chain or an end thereof and having a diameter of 0.5 μm to 200 μm,
    wherein the base resin includes foam cells having an average diameter of 20 μm to 50 μm distributed thereon.

2. The polyolefin resin molded product according to claim 1,
wherein a weight ratio of the at least one kind of polypropylene resin having the crystallization temperature of 112° C. or more and less than 125° C. to the at least one kind of polypropylene resin having the crystallization temperature of 125° C. to 150° C. is 1.5:1 to 10:1.

3. The polyolefin resin molded product according to claim 1,
wherein the at least one kind of polypropylene resin having a crystallization temperature of 125° C. to 150° C. and at least one kind of polypropylene resin having a crystallization temperature of 112° C. or more and less than 125° C. each include at least one selected from the group consisting of a propylene homopolymer, a copolymer of propylene and ethylene, a copolymer of propylene and C4-10 olefin monomer, and a block copolymer of polypropylene and ethylene-propylene rubber.

4. The polyolefin resin molded product according to claim 3,
wherein the copolymer of propylene and ethylene comprises a polyethylene repeat unit of less than 12 mol %.

5. The polyolefin resin molded product according to claim 1, wherein the at least one kind of polypropylene resin having a crystallization temperature of 125° C. to 150° C. and at least one kind of polypropylene resin having a crystallization temperature of 112° C. or more and less than 125° C. each have a melt index of 0.5 g/10 min to 10 g/10 min at a temperature of 230° C. and a pressure of 2.16 Kgf.

6. The polyolefin resin molded product according to claim 1,
wherein the at least one kind of polypropylene resin having the crystallization temperature of 125° C. to 150° C. is included in the content of 5 wt % to 40 wt % based on a total amount of the polypropylene resin.

7. The polyolefin resin molded product according to claim 1,
wherein the reactive functional group includes at least one selected from the group consisting of a carboxyl group and a hydroxyl group.

8. The polyolefin resin molded product according to claim 1,
wherein the base resin has a density of 0.3 g/ml to 0.8 g/ml.

9. The polyolefin resin molded product according to claim 1,
wherein the low density polyethylene has a density of 0.890 g/cm$^3$ to 0.940 g/cm$^3$.

10. The polyolefin resin molded product according to claim 1,
wherein the inorganic filler has an average diameter of 0.5 μm to 10 μm.

11. The polyolefin resin molded product according to claim 1,
wherein the polyolefin resin molded product comprises 65 wt % to 93 wt % of the combination of the of at least one kind of polypropylene resin having a crystallization temperature of 125° C. to 150° C. and the at least one kind of polypropylene resin having a crystallization temperature of 112° C. or more and less than 125° C., 5 wt % to 20 wt % of the low density polyethylene, 0.1 wt % to 10 wt % of the inorganic filler, and 0.1 wt % to 7 wt % of the olefin polymer pellets.

12. The polyolefin resin molded product according to claim 1,
wherein the polyolefin resin molded product has an izod impact strength of 37 kg·cm or more according to ASTM D256 Standard.

13. The polyolefin resin molded product according to claim 1,
wherein the polyolefin resin molded product has a heat deflection temperature of 80° C. or more at a pressure of 0.455 MPa according to ASTM D648 Standard.

14. The polyolefin resin molded product according to claim 1, wherein the foam cells has an average diameter of 25 μm to 45 μm.

* * * * *